(12) United States Patent
Krishnan et al.

(10) Patent No.: US 12,306,999 B2
(45) Date of Patent: *May 20, 2025

(54) SECURE AND POWER EFFICIENT AUDIO DATA PROCESSING

(71) Applicants: Advanced Micro Devices, Inc., Santa Clara, CA (US); ATI Technologies ULC, Markham (CA)

(72) Inventors: Guhan Krishnan, Boxborough, MA (US); Carl K. Wakeland, Santa Clara, CA (US); Saikishore Reddipalli, Santa Clara, CA (US); Philip Ng, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/992,451

(22) Filed: Nov. 22, 2022

(65) Prior Publication Data

US 2023/0078439 A1    Mar. 16, 2023

Related U.S. Application Data

(63) Continuation of application No. 16/721,895, filed on Dec. 19, 2019, now Pat. No. 11,514,194.

(51) Int. Cl.
| | | |
|---|---|---|
| G06F 21/00 | (2013.01) | |
| G06F 13/42 | (2006.01) | |
| G06F 15/78 | (2006.01) | |
| G06F 21/57 | (2013.01) | |

(Continued)

(52) U.S. Cl.
CPC .......... *G06F 21/74* (2013.01); *G06F 13/4221* (2013.01); *G06F 15/7807* (2013.01); *G06F 21/575* (2013.01); *H04L 67/104* (2013.01)

(58) Field of Classification Search
CPC .. G06F 21/74; G06F 13/4221; G06F 15/7807; G06F 21/575; G06F 21/606; G06F 21/79; G06F 13/4295; G06F 2213/0026; G06F 13/126; H04L 67/104; Y02D 10/00
See application file for complete search history.

(56) References Cited

U.S. PATENT DOCUMENTS

| | | | | |
|---|---|---|---|---|
| 11,514,194 | B2 * | 11/2022 | Krishnan | G06F 13/126 |
| 2009/0217377 | A1 * | 8/2009 | Arbaugh | G06F 11/3495 |
| | | | | 726/23 |

(Continued)

OTHER PUBLICATIONS

Haus et al., "Security and Privacy in Device-to-Device (D2D) Communication: a Review", IEEE Communications Surveys & Tutorials, vol. 19, No. 2, Second Quarter (Year: 2017).*

(Continued)

*Primary Examiner* — Morshed Mehedi
(74) *Attorney, Agent, or Firm* — Volpe Koenig

(57) ABSTRACT

Devices, methods, and systems for secure communications on a computing device. A host operating system (OS) runs on a host processor in communication with a host memory. A secure OS runs on a coprocessor in communication with a secure memory. The coprocessor receives information from an external device over a secure peer-to-peer (P2P) connection. The secure P2P connection is managed by the secure OS and is not accessible by the host OS.

20 Claims, 6 Drawing Sheets

(51) Int. Cl.
*G06F 21/74* (2013.01)
*H04L 67/104* (2022.01)

(56) References Cited

U.S. PATENT DOCUMENTS

| | | | | |
|---|---|---|---|---|
| 2014/0161279 | A1* | 6/2014 | Jones | H04S 3/008 |
| | | | | 381/97 |
| 2015/0153818 | A1* | 6/2015 | Jeon | H03K 19/017581 |
| | | | | 713/323 |
| 2016/0232354 | A1* | 8/2016 | Fraser | G06F 21/554 |
| 2016/0306978 | A1* | 10/2016 | Thadikaran | G06F 12/1441 |
| 2016/0378996 | A1* | 12/2016 | Smith | G06F 21/72 |
| | | | | 713/190 |
| 2019/0087362 | A1* | 3/2019 | Satish | G06F 3/0683 |
| 2019/0147192 | A1* | 5/2019 | Khosravi | G06F 21/575 |
| | | | | 713/192 |
| 2019/0228160 | A1* | 7/2019 | Hunsaker | G05B 19/0428 |
| 2019/0318097 | A1* | 10/2019 | Katragada | G06F 21/72 |
| 2019/0394338 | A1* | 12/2019 | Wada | H04M 9/082 |
| 2020/0374269 | A1* | 11/2020 | Lidman | H04L 63/10 |
| 2021/0056207 | A1* | 2/2021 | Tiwari | G06F 8/65 |

OTHER PUBLICATIONS

Patro et al., "A system for audio signalling based NAT Traversal", 2011 Third International Conference on Communication Systems and Networks, Date of Conference: Jan. 4-8, 2011.*

Castro et al., "Secure routing for structured peer-to-peer overlay networks", ACM SIGOPS Operating Systems Review, vol. 3, 6 Issue SI, pp. 299-314, Winter (Year: 2002).

Arm Platform Security Architecture Trusted Base System Architecture for Arm v6-M, Arm v7-M and Arm v8-M 2.0 (document No. DEN-0083) issued Dec. 13, 2019.

* cited by examiner

SECURE AND POWER EFFICIENT AUDIO DATA PROCESSING

CROSS REFERENCE TO RELATED APPLICATIONS

This application is a continuation of U.S. patent application Ser. No. 16/721,895, filed Dec. 19, 2019, the content of which is hereby incorporated by reference herein.

BACKGROUND

Modern computers and computing devices receive, process, and output audio information in various ways. For example, audio information from a video clip source may be output to a speaker, or voice information may be input from a headset microphone and output to a modem for transmission over the internet. In some cases, different levels of security concern apply to different kinds of audio information.

In some cases, the computing system processes the audio information using a dedicated co-processor, such as an audio co-processor (ACP). In order to receive the input data and provide it to the co-processor, a host operating system (OS) and central processing unit (CPU) of the computing device are typically activated to manage the data path from input to co-processor.

BRIEF DESCRIPTION OF THE DRAWINGS

A more detailed understanding can be had from the following description, given by way of example in conjunction with the accompanying drawings wherein.

DETAILED DESCRIPTION

Figure 1:
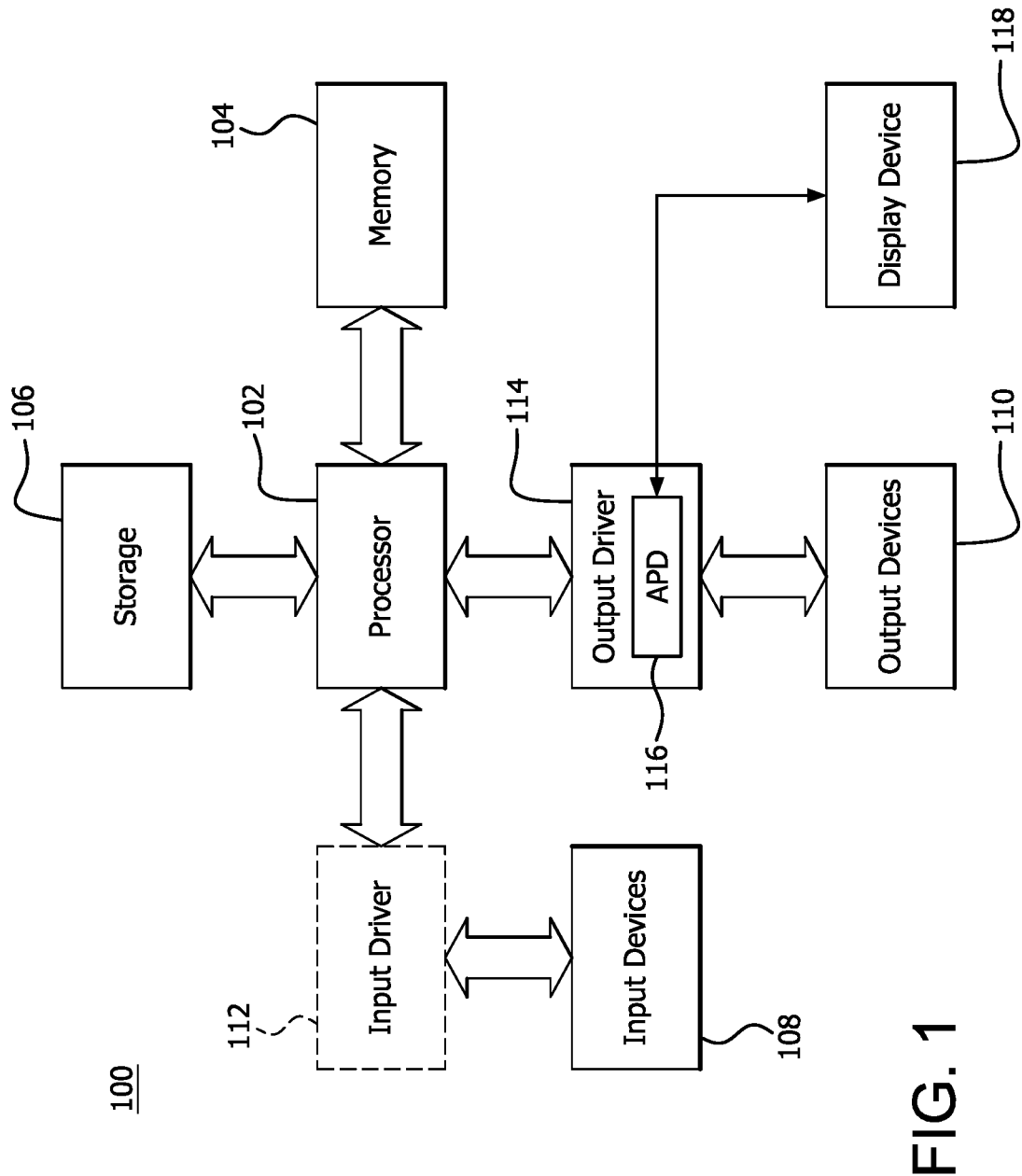
FIG. 1 is a block diagram of an example device in which one or more features of the disclosure can be implemented.

Some implementations include a computing device. The computing device includes a host processor in communication with a host memory and running a host operating system; a coprocessor in communication with a secure memory and an external device and running a secure operating system. The coprocessor is configured to receive information from the external device over a secure peer-to-peer (P2P) connection. The secure P2P connection is managed by the secure OS and is not accessible by the host OS.

In some implementations, the computing device comprises a system-on-chip (SOC). In some implementations, the coprocessor is programmed on boot by a root of trust (ROT). In some implementations, the secure OS is secured by a ROT. In some implementations, the coprocessor is configured to receive the information from the external device over the secure P2P connection via a port of a communications interface, wherein the port is not accessible by the host OS. In some implementations, the communications interface is a Peripheral Component Interconnect enhanced (PCIe) interface. In some implementations, a memory of the secure OS is partitioned from a memory of the host OS. In some implementations, an address space of the secure OS is partitioned from an address space of the host OS. In some implementations, the external device is not contained in a device tree of the host OS. In some implementations, if the coprocessor receives the information from the external device over the secure P2P connection, the host processor is not activated.

Some implementations provide a method for secure communications on a computing device. The method includes running a host OS on a host processor in communication with a host memory; running a secure OS on a coprocessor in communication with a secure memory; and receiving, by the coprocessor, information from an external device over a secure P2P connection. The secure P2P connection is managed by the secure OS and is not accessible by the host OS.

In some implementations, the computing device comprises a SOC. In some implementations, the coprocessor is programmed on boot by a ROT. In some implementations, the method also includes securing the secure OS using a ROT. In some implementations, the method also includes receiving the information from the external device, by the coprocessor, over the secure P2P connection, via a port of a communications interface, wherein the port is not accessible by the host OS. In some implementations, the communications interface is a PCIe interface. In some implementations, the method also includes partitioning a memory of the secure OS from a memory of the host OS. In some implementations, the method also includes partitioning an address space of the secure OS from an address space of the host OS. In some implementations, the external device is not contained in a device tree of the host OS. In some implementations, if the coprocessor receives the information from the external device over the secure P2P connection, the host processor is not activated.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is be located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
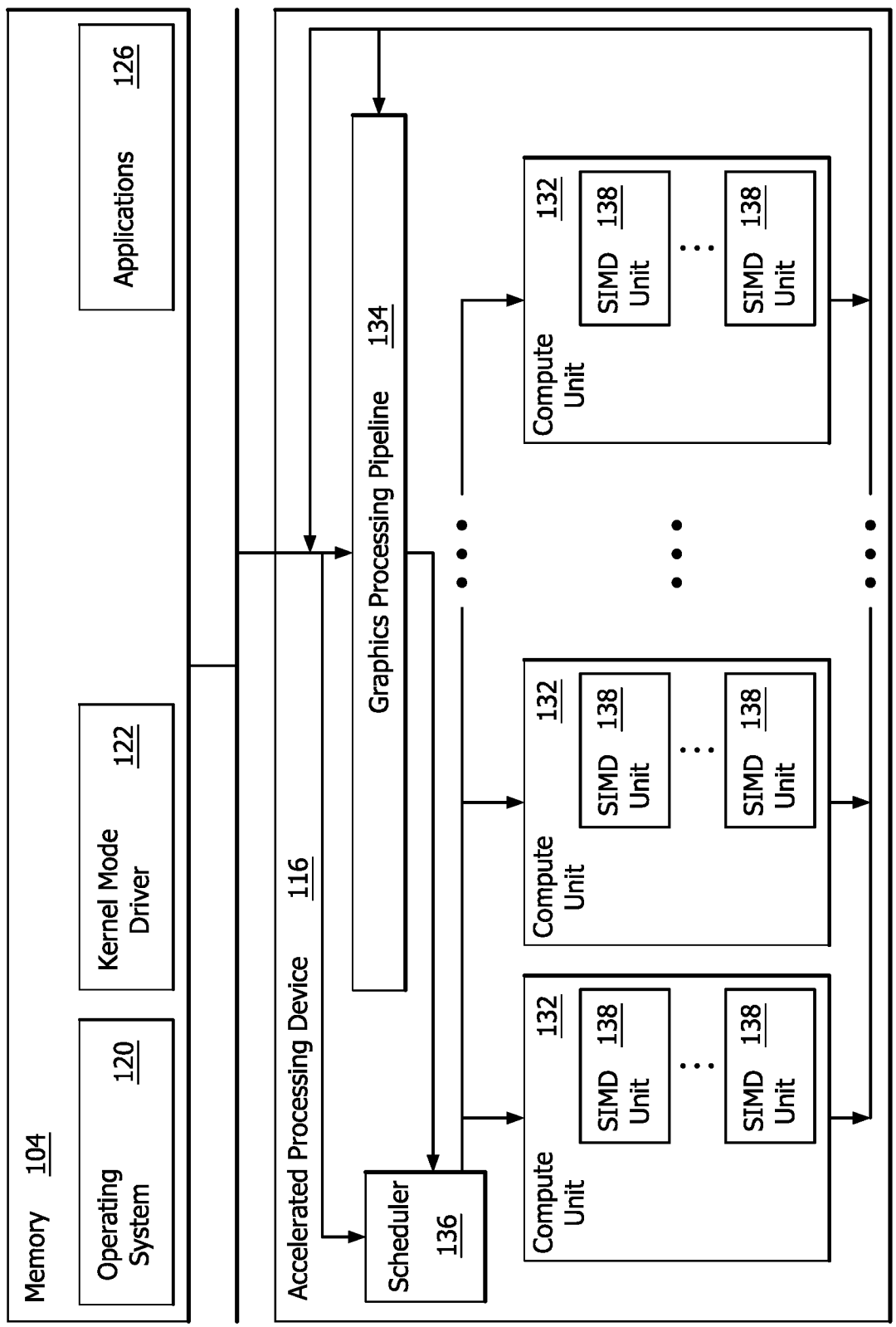
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
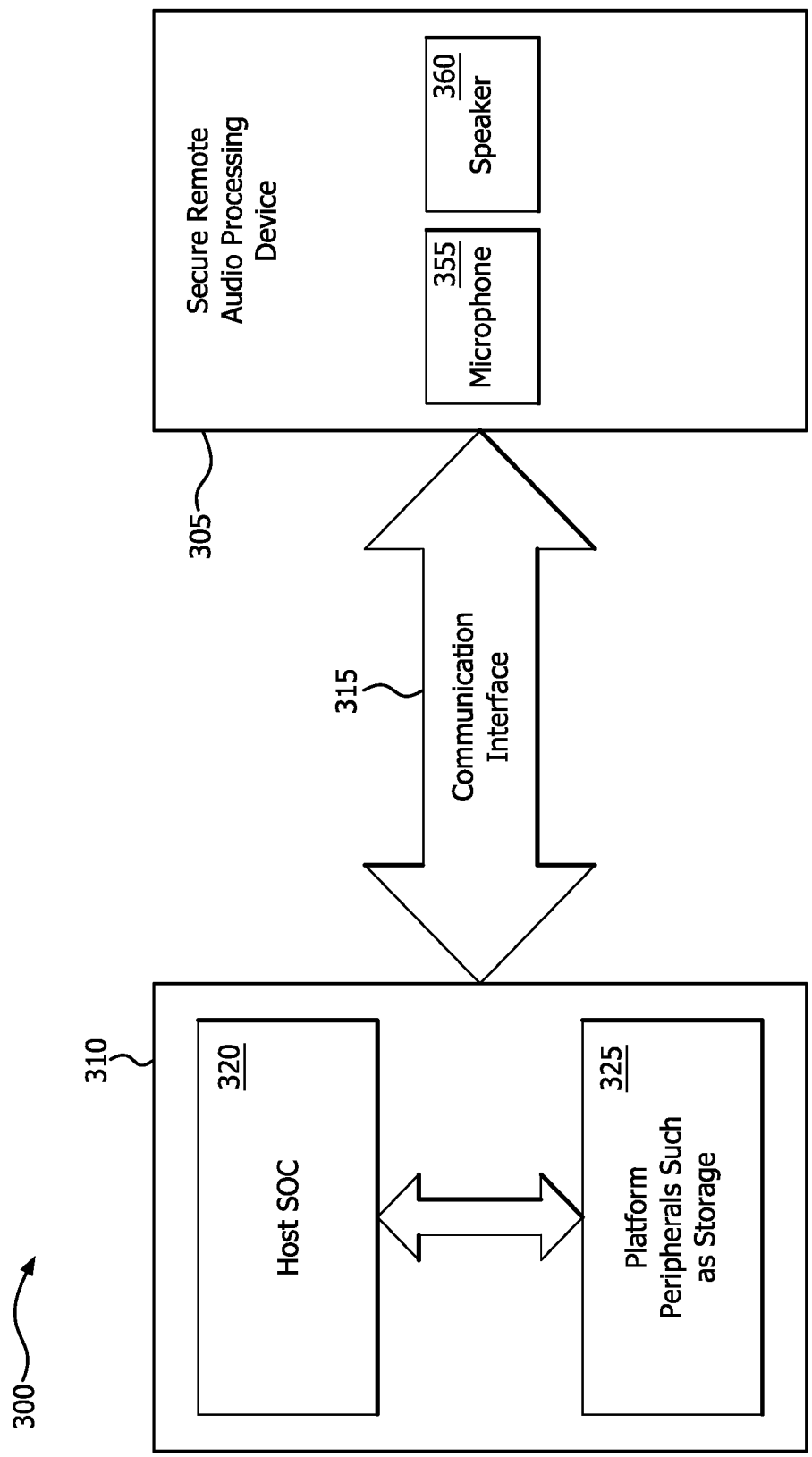
FIG. 3 is a block diagram illustrating aspects of an example communication system.

FIG. 3 is a block diagram illustrating aspects of an example communication system 300. System 300 includes a secure remote audio processing device 305 in communication with a host computing device 310 over a communication interface 315. In this example, communications are discussed with respect to audio information sent to host computing device 310 from secure remote audio processing device 305, and received from computing device 310 by secure remote audio processing device 305; however the security principles discussed are applicable to other kinds of communications (e.g., video, telemetry, or other data) transmitted and received by secure remote audio processing device 305, or by other type of communications device (e.g., a webcam, smart phone, home security system, or other device which generates and/or consumes audio, video, or other data).

Secure remote audio processing device 305 includes microphone 355 and speaker 360. Secure remote audio processing device 305 is implemented as one of input devices 108 as shown and described with respect to FIG. 1 in some examples. Secure remote audio processing device 305 is configured to manage information input from a user and/or surrounding environment using microphone 355. Secure remote audio processing device 305 also includes circuitry configured to manage information output to the user and/or surrounding environment using speaker 360. Secure remote audio processing device 305 also includes circuitry configured to communicate the input and output information to and from the host computing device 310 using communication interface 315.

Host computing device 310 includes a host system-on-chip (SOC) 320 or other suitable computing device (e.g., processor 102 as shown and described with respect to FIG. 1) in communication with platform peripherals 325. Peripherals 325 include storage and other hardware and/or software resources for performing computations or other actions on information (e.g., audio data) output to and received from secure remote audio processing device 305 over communication interface 315.

Communications interface 315 includes any suitable medium (cable and/or wireless) for communicating information between secure remote audio processing device 305 and host computing device 310. In some implementations, the information is transmitted according to an interface and/or communications standard, such as PCIe, Bluetooth, or another suitable standard.

In some implementations, secure remote audio processing device 305 is a mixed, virtual, or augmented reality headset which transmits real-world pixel and audio information to the host computing device 310 for processing. In this example, audio capture and playback is not controlled by host SOC 320, but by other chipsets (e.g., control circuitry 335 on secure remote audio processing device 305. However, host SOC 320 performs audio processing and communications with platform peripherals that are involved in audio processing (e.g. storage). The pixel and audio information is expected to be private, and data flows handling this information are secured from malicious software as further discussed herein. For example, audio data communications and processing are isolated from applications running on a host OS on host SOC 320 in some implementations.

Figure 4:
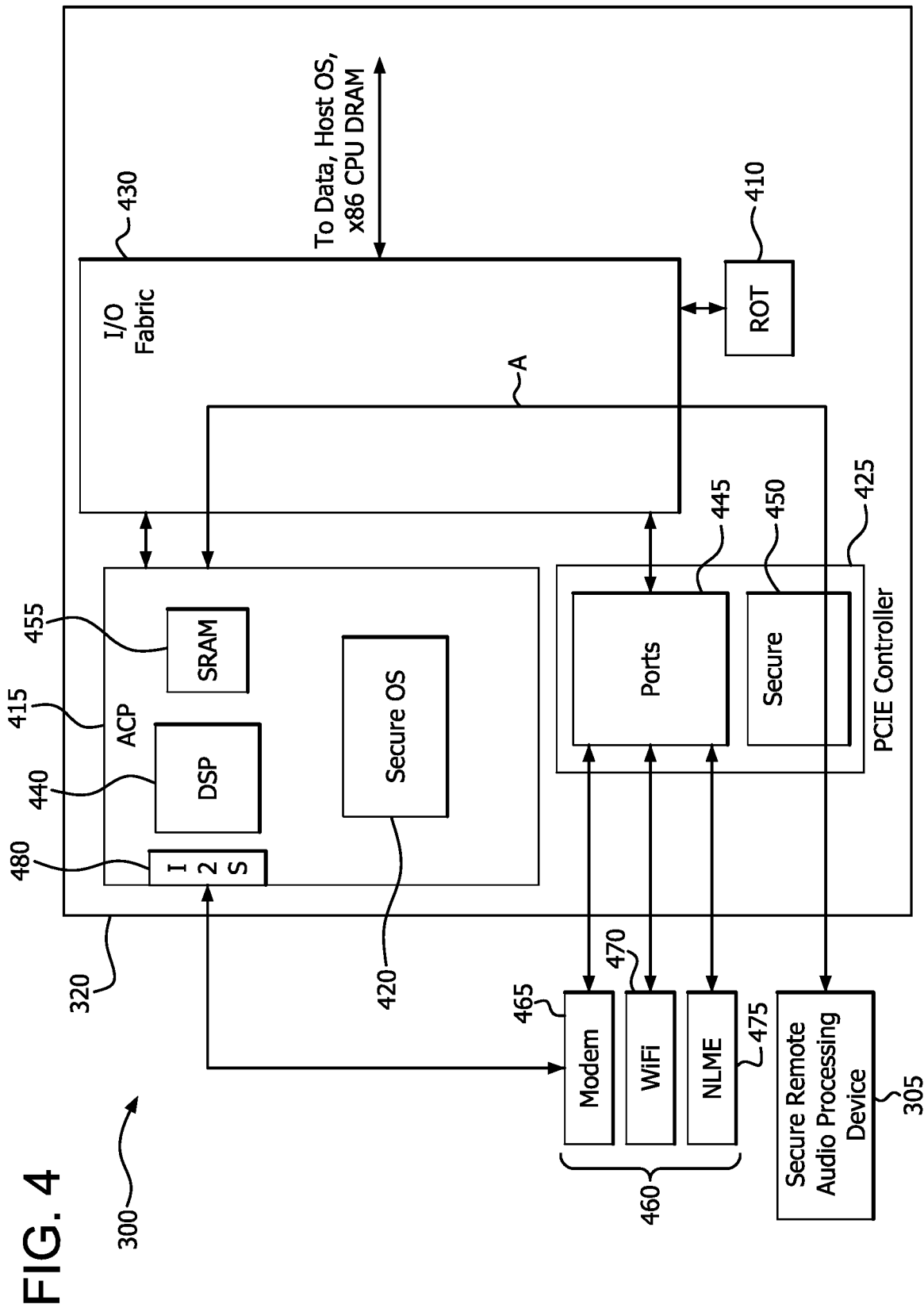
FIG. 4 is a block diagram illustrating aspects of an example audio communication system.

FIG. 4 is a block diagram illustrating further aspects of example communication system 300. FIG. 4 includes secure remote audio processing device 305 in communication with host SOC 320. FIG. 4 omits depiction of communication interface 315 and some aspects of host computing system 310 and secure remote audio processing device 305 for clarity and ease of description.

As shown in FIG. 4, host SOC 320 includes a root of trust (RoT) 410 an audio coprocessor (ACP) 415, a peripheral component interconnect enhanced (PCIe) controller 425, and an input/output (I/O) fabric 430. In this example, PCIe controller 425 is used as an example I/O controller, however any other suitable I/O controller (e.g., a Universal Serial Bus (USB) controller) is usable in other implementations, instead of or in addition to PCIe controller 425. SOC 320 is implemented as a SOC for the sake of example; however in other implementations any suitable computing device, such as a personal computer, server, smart phone, tablet computer, and so forth, are used. Such devices are implemented using either SOCs, discrete system components, or both in some implementations.

RoT 410 includes secure software or firmware which runs on hardware (e.g., dedicated RoT hardware) outside of, and in communication with (e.g., via I/O fabric 430), ACP 415. The software or firmware is stored in a ROM and runs in a secure run-time memory (e.g., onboard RoT 410). In some implementations, the RoT identifies (e.g., during boot) ports (e.g., predetermined ports) as secure and programs I/O fabric 430 (e.g., during boot) to route secure traffic between specific secure ports. In some examples, the source to destination routing is implemented by associating a unique source-and-destination-identification (e.g., based on a Unit ID) based routing between specific source and destination ports. In some examples, the source to destination routing is implemented by associating security levels with source and destination ports (e.g., a multiple source and destination Unit ID). RoT 410 also operates to confirm the security of various software and firmware that facilitates secure audio communications, including software and firmware running on ACP 415, as further described herein.

ACP 415 is a dedicated co-processor device configured to perform calculations on audio data. ACP 415 includes a secure OS 420, a static random access memory (SRAM) 435, and a digital signal processor (DSP) 440. DSP 440 is configured to carry out digital signal processing algorithms (e.g., for audio processing). Examples of such algorithms include finite impulse response (FIR) filtering algorithms, and so forth. Typically, a DSP will perform such algorithms more efficiently (e.g., faster, and/or using less power) than a CPU or other processor in a computing system. Accordingly, in some implementations, a host OS transfers data to DSP 440 to perform such calculations, and retrieves or receives the results after DSP 440 has completed the calculations.

DSP 440 includes firmware running on ACP 415 and one or more ring buffers (i.e., circular buffers), which are implemented in SRAM 435 in this example, or are implemented in other hardware in other implementations. SRAM 435 is a working memory for DSP 440. The DSP firmware running on ACP 415 is authenticated by RoT 410 (e.g., is programmed by RoT 410 on cold boot) and restricts access to SRAM 435 to secure communications from secure remote audio processing device 305 and DSP 440 (i.e., only secure remote audio processing device 305 and ACP 415 can access SRAM 440). In some implementations, fencing hardware restricts access to audio data (e.g., sensitive audio data) stored in SRAM 440 such that the audio data is inaccessible to applications running on the host CPU. In the example of FIG. 4, RoT 410 identifies the secure remote audio processing device 305 and ACP 415 as source and destination of a secure data path A (i.e., a data path between only secure remote audio processing device 305 and ACP 415.)

Secure OS 420 is a real-time secure OS running on ACP 415 and partitioned from the host OS. Communication with the host OS is initiated from secure OS 420. Secure OS 420 chooses when to push data (e.g., when it has data to share).

ACP 415 is configured to boot and run independent secure OS 420 isolated from the primary OS (e.g., a host OS running on a CPU of host computing device 405. Secure OS 415 is stored in a ROM (e.g., on RoT 410 or ACP 415)

before boot, runs in a secure run-time memory on ACP 415, and is authenticated by RoT 410, and/or is security assured in another suitable manner.

The isolation of secure OS 420 is enforced by partitioning the I/O space; e.g., during cold boot of the host computing device 405. This partitioning segregates the I/O space of secure OS 420 from the host I/O space. In some implementations, the memory space of secure OS 420 is also partitioned, e.g., during cold boot, to segregate the secure OS memory from the host OS memory. Secure OS 420 manages the configuration space for secure remote audio processing device 305, and prevents the host OS and applications running on the host OS from accessing the configuration space. Secure remote audio processing device 305 is not visible in the device tree of the host OS.

PCIe controller 425 includes circuitry which manages a PCIe interface between external devices (e.g., secure remote audio processing device 305) and the I/O fabric 430 of SOC 320. PCIe controller 425 implements one or more ports 445, and one or more secure ports 450. PCIe controller 425 is programmed to identify paths from secure remote audio processing device 305 via secure ports 450 as secure, and to route secure audio traffic with secure remote audio processing device 305 only to and from secure ports 450. This programming of the PCIe controller is authenticated using RoT 410 (e.g., is programmed by ROT 410 on cold boot). In some implementations, the path identification and routing is implemented by enforcing a unique source ID for ACP 415 and secure headset controller 420 to create a hardware isolated path for the audio data between secure remote audio processing device 305 and ACP 415 through I/O fabric 430.

An example hardware isolated path between secure remote audio processing device 305 and ACP 415 is shown as hardware isolated path A in FIG. 4. Hardware isolated path A is a peer-to-peer connection between secure remote audio processing device 305 and ACP 415. Accordingly, the host OS and CPU of SOC 305 do not necessarily need to be activated for communications on hardware isolated path A. In some implementations, this can have the advantage of providing power savings.

Host OS-visible peripheral devices 460 communicate with SOC 320 over ports 445 (which are not secured by the programming of secure ports 450) and I/O fabric 430. Peripheral devices 460 include a modem 465, WiFi device 470, and non-volatile memory express (NVMe) device 475 in this example. For example, modem 465 communicates with the host OS, CPU, and non-secured aspects of DSP 440 over one or more of ports 445, but is prevented from communicating with SRAM 435 or secure headset controller 420 by the RoT secured programming of PCIe controller 425. It is noted that peripheral devices 460 may also include other communication interfaces, which may or may not be visible to the host OS. For example modem 465 may have an Inter-IC Sound (I2S) interface 480 with ACP 415, which may be securely managed by RoT authenticated DSP firmware running on ACP 415. Communications over I2S interface 480 are also a form of secure, peer-to-peer communication.

In some cases, other secure communications paths are implemented in SOC 320. For example, in some implementations, DSP firmware running on ACP 415 programs a control interface between ACP 415 and secure remote audio processing device 305. This control interface routes secure audio information between ACP 415 and secure remote audio processing device 305 only. The programming of the control interface by the DSP firmware is authenticated using the RoT in secure headset controller 420. In some implementations, the path identification and routing is implemented by enforcing a unique source ID for ACP 415 and secure headset controller 420 to create a hardware isolated path for secure data between ACP 415 and secure headset controller 420 through I/O fabric 430. The unique source ID is programmed in the I/O fabric 430 (or one or more devices thereof) by the RoT, and cannot be changed by any other software in the system.

I/O fabric 430 is a communications medium which facilitates communication among ACP 415, RoT 410, PCIe controller 425, and other devices on host computing device 405, such as one or more CPUs running a host OS, main memory (e.g., DRAM), and so forth. I/O fabric 430 includes any suitable hardware, software, firmware, or any combination of these, for implementing the communications medium (e.g., including processors, buffers, receivers, transmitters, wires, and/or the like). I/O fabric 430 carries both secure and unsecure communications, as shown. I/O fabric 430 is used for the sake of example; any other suitable interconnection among the components of SOC 320 is usable in other implementations.

Figure 5:
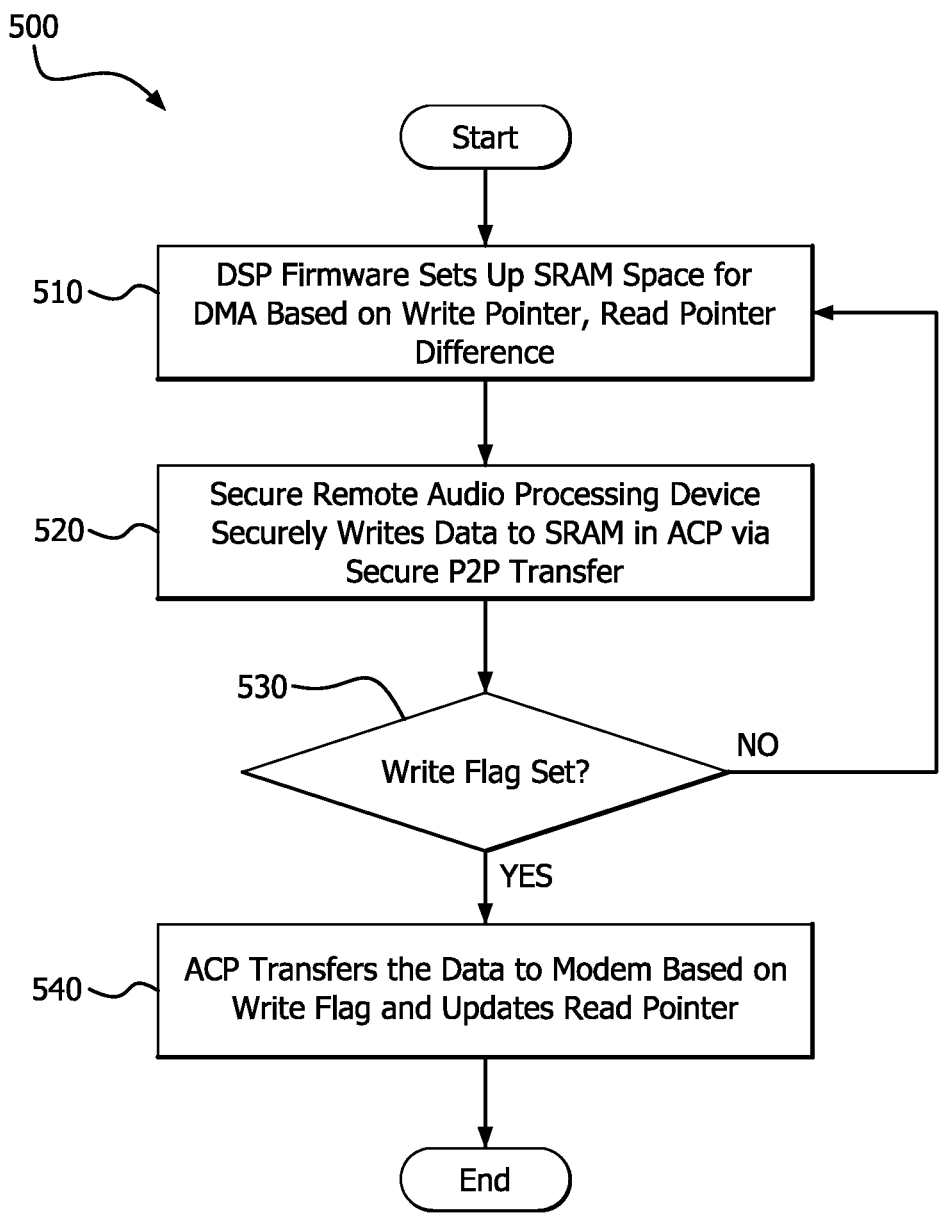
FIG. 5 is a flow chart illustrating aspects of an example use case for the example audio communication system shown and described with respect to FIG. 4.

FIG. 5 is a flow chart illustrating a procedure 500 for an example use case for audio communication system 300 (shown and described with respect to FIGS. 3 and 4). Procedure 500 transfers audio information captured in the secure remote audio processing device 305 to modem 465, which is connected to the host SOC. The data path setup, described with respect to FIG. 4, does not permit data stored in SRAM 435 to be read directly by modem 465 via any interface. In the example of FIG. 5, this is because the driver of modem 465 runs on the host OS, and host OS is excluded from accessing SRAM 435. Only a peer-to-peer signal from the RoT-authenticated secure remote audio processing device 305 is permitted to initiate a transfer of audio data from SRAM 435 to modem 465. The host OS can set up basic modem operations for modem 465, but the audio data is isolated from the host OS.

Accordingly, in 510, the RoT-authenticated DSP firmware 440 running on ACP 415 sets up buffer space in SRAM 435 (e.g., a ring or circular buffer) to store audio information for DMA transfer from secure remote audio processing device 305. The buffer space set up in SRAM 435 includes initializing a write pointer (e.g., "WrPtr") and a read pointer (e.g., "RdPtr"). A difference in address between the write pointer and the read pointer indicates an amount of buffer space available to write.

In 520, secure remote audio processing device 305 securely writes the audio information to the buffer space in SRAM 435 via a secure peer-to-peer transfer and updates the write pointer to indicate the amount of buffer space taken up by the write. The transfer takes place over hardware secured path A. This is a peer-to-peer transfer that does not require activation of the host OS or host processor.

In 530, if secure remote audio processing device 305 sets a write flag for the SRAM buffer space in the DSP firmware 440 (over secure hardware path A) to indicate that it has finished writing data to the buffer space, the ACP 415 determines the amount of data to transfer to modem 465 based on a difference between the values of the read pointer and write pointer, sends the audio information to modem 465 from the SRAM buffer in a DMA transfer over a secure path (e.g., over I2S interface 480) and updates the read pointer to indicate the amount of buffer space that has been freed by the DMA transfer. This is a peer-to-peer transfer that does not require activation of the host OS or host processor. Accordingly, the transfer is isolated from the host OS from a security standpoint, and in some cases power is saved by not activating the host OS. A write flag used in this example, however other implementations use any suitable interrupt from secure remote audio processing device 305 to the DSP firmware 440, or other suitable signal.

Figure 6:
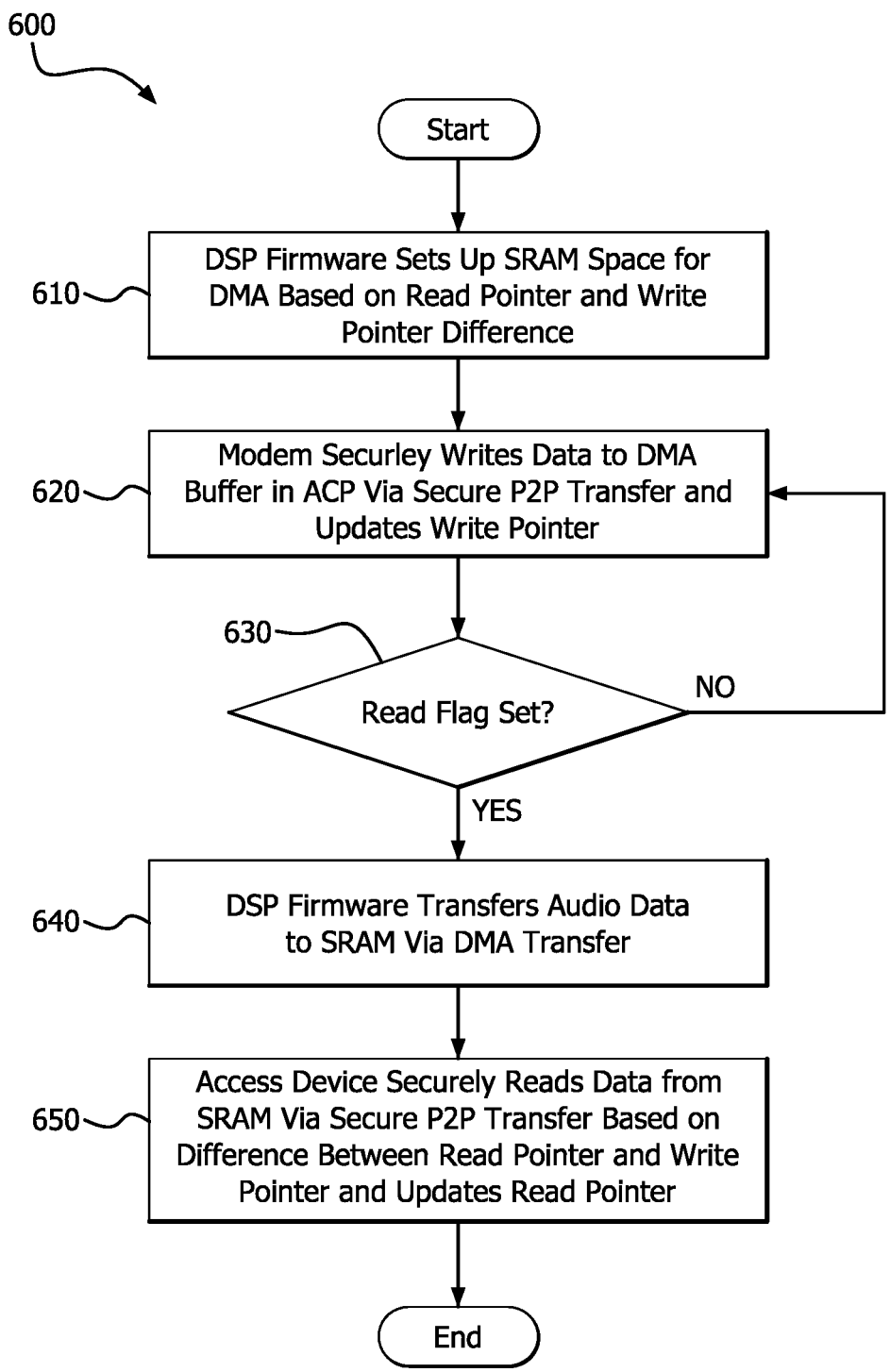
FIG. 6 is a flow chart illustrating an example use case for the example audio communication system 400 as shown and described with respect to FIG. 4.

FIG. 6 is a flow chart illustrating a procedure 600 for another example use case for audio communication system 300 (shown and described with respect to FIGS. 3 and 4). Procedure 600 transfers audio information (e.g., streaming music or audio data) from modem 465 to secure remote audio processing device 305. The data path setup, described with respect to FIG. 4, does not permit modem 465 to write directly to SRAM 435 via any interface. In the example of FIG. 6, this is because the driver of modem 465 runs on the host OS, and host OS is excluded from accessing SRAM 435. Only a peer-to-peer signal from RoT-authenticated secure remote audio processing device 305 is permitted to initiate a transfer of audio data from SRAM 435 to secure remote audio processing device 305 (e.g., secure hardware path A). The host OS can set up basic modem operations for modem 465, but the audio data is isolated from the host OS.

Accordingly, in 610, the RoT-authenticated DSP firmware 440 running on ACP 415 sets up buffer space in SRAM 435 (e.g., a ring or circular buffer) to store audio information for DMA transfer from modem 465. The buffer space set up in SRAM 435 includes initializing a write pointer (e.g., "WrPtr") and a read pointer ("RdPtr"). A difference in address between the write pointer and the read pointer indicates an amount of buffer space available to write.

In 620, modem 465 transfers audio information to the buffer space in SRAM 435 in a DMA transfer over a secure path (e.g., over secure I2S interface 480) and updates the write pointer to indicate the amount of buffer space taken up by the write. This is a peer-to-peer transfer that does not require activation of the host OS or host processor.

In 630, if secure remote audio processing device 305 sets a read request flag bit to indicate that it is ready to read the data stored in the SRAM buffer space to the DSP firmware 440 (over secure hardware path A) to indicate that it is ready to accept data from the buffer space, the ACP 415 then determines the amount of data to transfer from the SRAM buffer space based on a difference between the values of the read pointer and write pointer, and updates the write pointer indicating the amount of new data from the modem is available to be read by the secure remote audio device.

Secure remote audio processing device 305 reads the difference between the write and read buffer to calculate the amount of data to read and securely reads the audio information from SRAM 435 via a secure peer-to-peer transfer in 650. The peer-to-peer transfer takes place over hardware secured path A. This is a peer-to-peer transfer that does not require activation of the host OS or host processor. Accordingly, the transfer is isolated from the host OS from a security standpoint, and in some cases power is saved by not activating the host OS. Upon completion of read, the secure remote audio processing device updates the "RdPtr" by the amount of data it read. A read request bit is used in this example, however other implementations use any suitable interrupt from secure remote audio processing device 305 to the DSP firmware 440, or other suitable signal.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, the SIMD units 138, may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system for secure communications, the system comprising:
    a host processor, communicatively coupled to a host memory, configured to run a host operating system (OS); and
    a secure coprocessor, communicatively coupled to a secure memory and the host processor, configured to run a secure OS;
    wherein the secure coprocessor is further configured to:
    establish a secure peer-to-peer (P2P) connection to an external device, wherein the secure P2P connection is not accessible by the host OS; and
    transfer data between the host OS and the external device using the secure P2P connection.

2. The system of claim 1, wherein the host processor comprises a system-on-chip (SOC).

3. The system of claim 1, wherein the secure coprocessor is programmed on boot by a root of trust (ROT).

4. The system of claim 1, wherein the secure OS is secured by a root of trust (ROT).

5. The system of claim 1, wherein the secure P2P connection utilizes a port of a communications interface, wherein the port is not accessible by the host OS.

6. The system of claim 5 wherein the communications interface is a Peripheral Component Interconnect enhanced (PCIe) interface.

7. The system of claim 1, wherein a memory of the secure OS is partitioned from the host memory.

8. The system of claim 1, wherein an address space of the secure OS is partitioned from an address space of the host OS.

9. The system of claim 1, wherein the external device is not contained in a device tree of the host OS.

10. The system of claim 1, wherein the data is transferred between the external device and the secure memory via Direct Memory Access (DMA) over the secure P2P connection.

11. A method for secure communications, the method comprising:
- running a host operating system (OS) on a host processor, the host processor in communication with a host memory;
- running a secure OS on a secure coprocessor that is communicatively coupled to a secure memory;
- establishing, by the secure coprocessor, a secure peer-to-peer (P2P) connection to an external device, wherein the secure P2P connection is not accessible by the host OS; and
- transferring, by the secure coprocessor, data between the host OS and the external device using the secure P2P connection.

12. The method of claim 11, wherein the host processor comprises a system-on-chip (SOC).

13. The method of claim 11, wherein the secure coprocessor is programmed on boot by a root of trust (ROT).

14. The method of claim 11, further comprising securing the secure OS by a root of trust (ROT).

15. The method of claim 11, wherein the transferring data is performed via a port of a communications interface, wherein the port is not accessible by the host OS.

16. The method of claim 15 wherein the communications interface is a Peripheral Component Interconnect enhanced (PCIe) interface.

17. The method of claim 11, further comprising partitioning a memory of the secure OS from the host memory.

18. The method of claim 11, further comprising partitioning an address space of the secure OS from an address space of the host OS.

19. The method of claim 11, wherein the external device is not contained in a device tree of the host OS.

20. The method of claim 11, wherein the data is transferred between the external device and the secure memory via Direct Memory Access (DMA) over the secure P2P connection.

* * * * *